(12) United States Patent
Zhang

(10) Patent No.: US 7,489,506 B2
(45) Date of Patent: Feb. 10, 2009

(54) COMPUTER ENCLOSURE WITH DRIVE BRACKET

(75) Inventor: Jia-Min Zhang, Shenzhen (CN)

(73) Assignees: Hong Fu Jin Precision Industry (Shen Zhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 28 days.

(21) Appl. No.: 11/778,669

(22) Filed: Jul. 17, 2007

(65) Prior Publication Data

US 2008/0239652 A1  Oct. 2, 2008

(30) Foreign Application Priority Data

Mar. 27, 2007 (CN) .......................... 2007 2 0200185

(51) Int. Cl.
*G06F 1/16* (2006.01)
(52) U.S. Cl. ...................... 361/685; 359/698; 211/26.2; 248/300

(58) Field of Classification Search ................. 359/227, 359/698, 290; 211/26.2, 26; 248/298.1, 248/300; 360/97.01, 264.2; 312/223.2; 361/679–687, 361/724–727
See application file for complete search history.

(56) References Cited

U.S. PATENT DOCUMENTS

| 6,377,447 | B1 * | 4/2002 | Boe ........................... 361/685 |
| 6,882,527 | B2 | 4/2005 | Wang et al. |
| 7,345,237 | B2 * | 3/2008 | Chen et al. ..................... 174/50 |
| 2004/0095717 | A1 * | 5/2004 | Hsu et al. .................... 361/685 |

\* cited by examiner

*Primary Examiner*—Hung V Duong
(74) *Attorney, Agent, or Firm*—Frank R. Niranjan

(57) ABSTRACT

A computer enclosure includes a cover panel, a blocking piece attached to the cover panel, and a drive bracket secured in the computer enclosure. The drive bracket includes a side panel. A top flange is perpendicularly bent out from a top edge of the side panel. The blocking piece includes a flange. The flange extends downwardly and perpendicularly from edges of the block. The flange of the blocking piece resists against the top flange of the drive bracket in order to prevent the drive bracket from deforming outward.

13 Claims, 4 Drawing Sheets

COMPUTER ENCLOSURE WITH DRIVE BRACKET

BACKGROUND

1. Field of the Invention

The present invention relates to computer enclosures, and more particularly to a computer enclosure with a drive bracket.

2. Description of Related Art

When a conventional computer is assembled, a drive bracket is firstly mounted in a computer enclosure. Then data storage devices such as a hard disk drive (HDD), a floppy disk drive (FDD), and a compact disk read only memory (CD-ROM) drive are accommodated in the drive bracket.

Users and manufacturers desire the data storage devices to be installed in the drive bracket quickly and easily. The data storage devices are typically secured to the drive bracket with a number of screws. However, it is cumbersome and time-consuming. Extra components such as screws increase costs. Furthermore, during assembly, extra operating space for attaching the screws is required.

Nowadays, the data storage devices are installed in the drive bracket of the computer enclosure by sliding. Such means is convenient to install or uninstall the data storage devices. However, the engagement between the data storage devices and the drive bracket is not secure enough. If the computer enclosure suffers an impact, it is possible for the drive bracket to deform and allow the data storage devices to disengage from the drive bracket.

What is needed, therefore, is a computer enclosure having a simple structure for preventing drive brackets from deforming when the computer enclosure suffers an impact.

SUMMARY

A computer enclosure includes a cover panel, a rectangular blocking piece attached to the cover panel, and a drive bracket secured in the computer enclosure. The drive bracket includes a side panel. A top flange is perpendicularly bent out from a top edge of the side panel. The blocking piece includes a flange. The flange extends downwardly and perpendicularly from edges of the blocking piece. The flange of the blocking piece resists against the top flange of the drive bracket in order to prevent the drive bracket from deforming outward.

Other advantages and novel features will be drawn from the following detailed description of preferred embodiments with attached drawings, in which:

DETAILED DESCRIPTION OF THE EMBODIMENT

Figure 1:
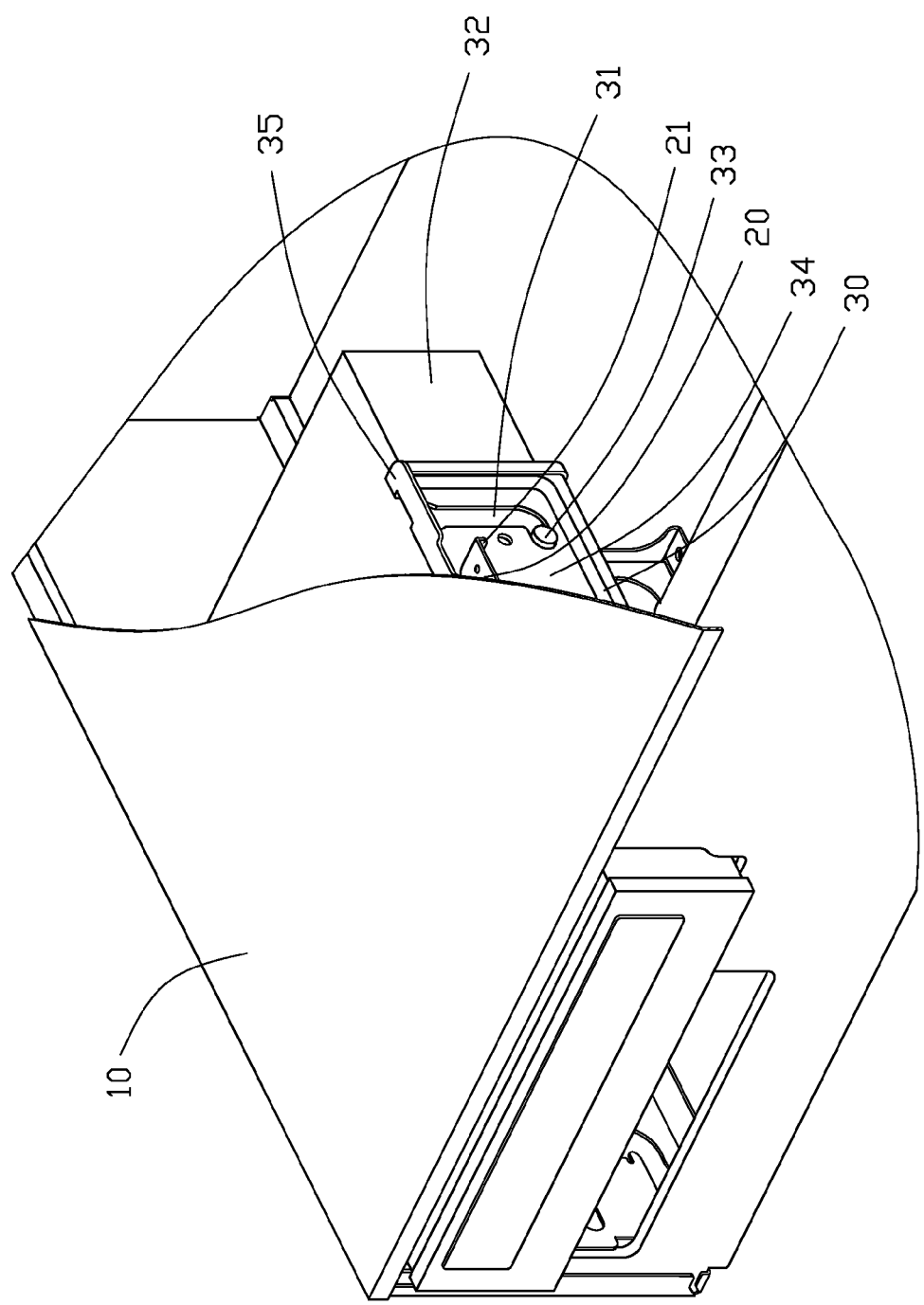
FIG. 1 is an assembled view of a computer enclosure with a drive bracket in accordance with a preferred embodiment of the present invention.
Figure 2:
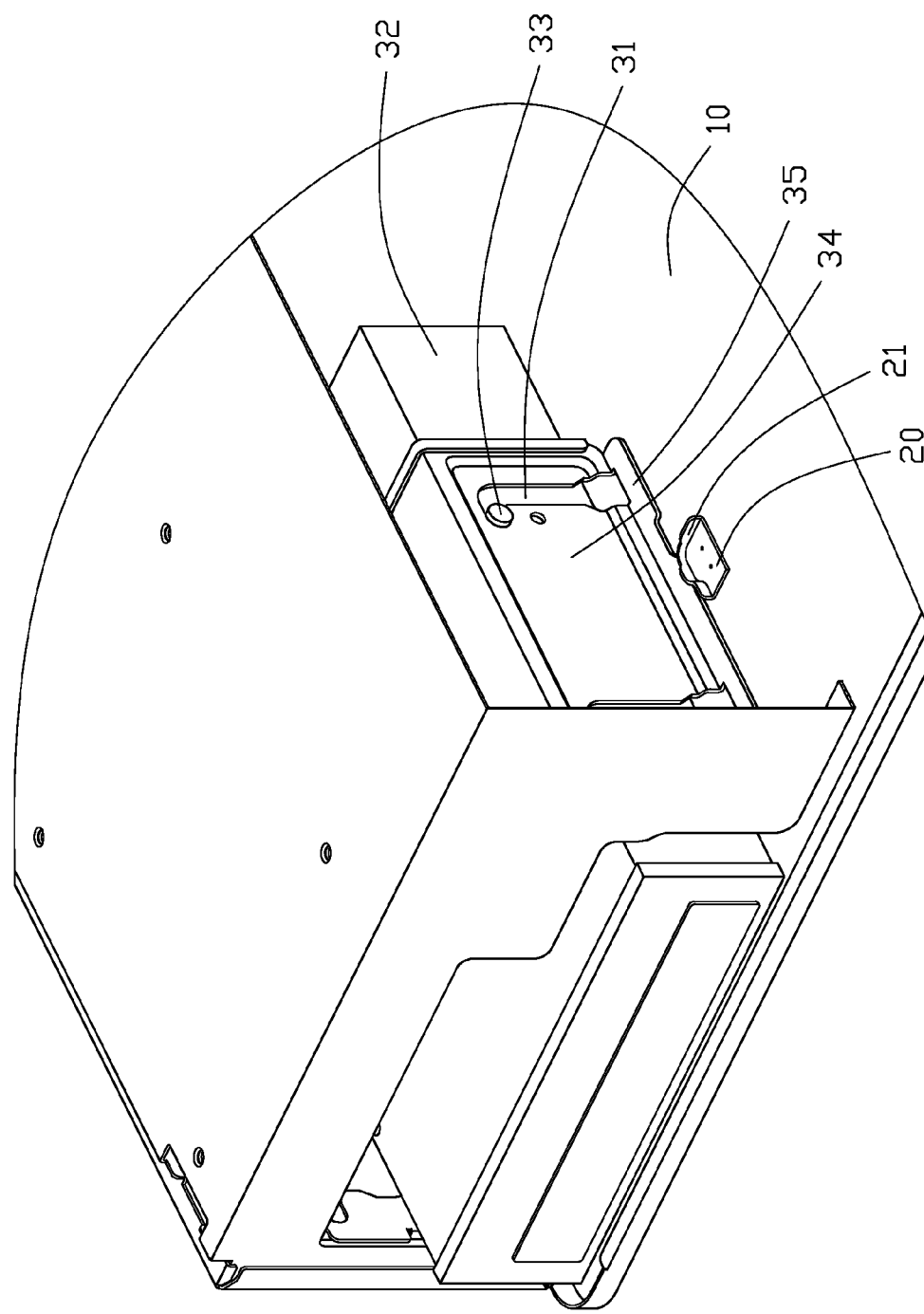
FIG. 2 is similar to FIG. 1, but viewed from another aspect.

Referring to FIGS. 1 and 2, a computer enclosure in accordance with a preferred embodiment of the present invention comprises a cover panel 10, a rectangular blocking piece 20 attached to the cover panel 10, and a drive bracket 30.

The blocking piece 20 includes a flange 21 extending downwardly and perpendicularly from edges of the blocking piece 20. The drive bracket 30 includes a side panel 34. The side panel 34 defines a sliding slot 31 therein. A top flange 35 extends outwards and horizontally from a top edge of the side panel 34. The flange 21 and the top flange 35 are perpendicular to each other. The flange 21 of the blocking piece 20 is tightly resisted against the top flange 35 of the side panel 34. The width of the sliding slot 31 increases gradually from bottom to top until the sliding slot 31 extends into the top flange 35. When a data storage device 32 is installed in the drive bracket 30, a sliding member 33 of the data storage device 32 slides into the sliding slot 31 from the top flange 35 to the bottom of the sliding slot 31. The sliding member 33 is engaged into the bottom of the sliding slot 31 so that the data storage device 32 is secured in the drive bracket 30. When the drive bracket 30 suffers an impact, the flange 21 resists against the top flange 35 of the side panel 34 in order to prevent the side panel 34 from deforming outward. A portion of the flange 21, at which the flange 21 resists against the top flange 35, is formed in an arc shape so as to press out the top flange 35 of the side panel 34. The blocking piece 20 is secured to the cover panel 10 by riveting or in other manners. The blocking piece 20 can also be a protrusion.

Figure 3:
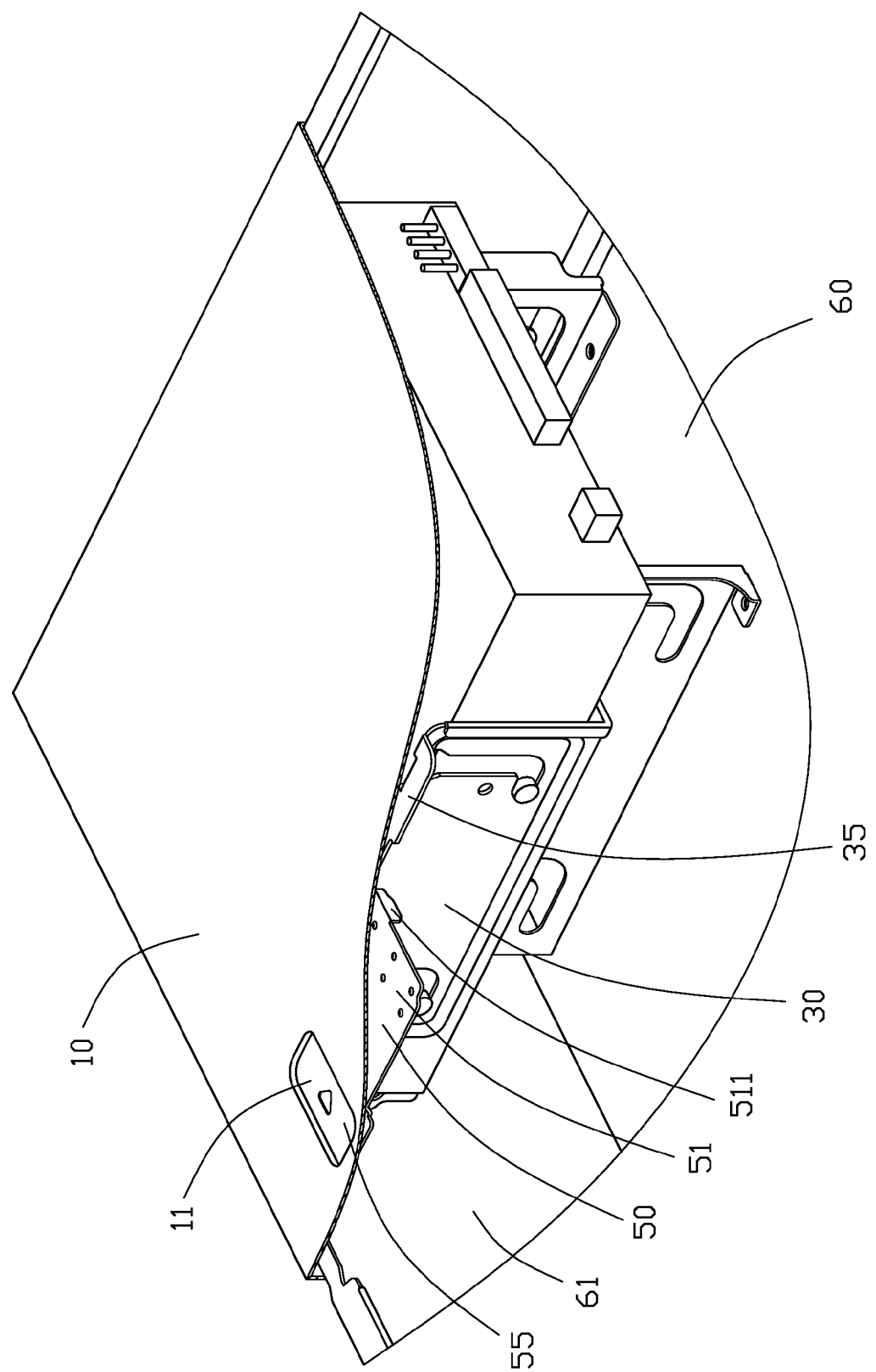
FIG. 3 is an assembled view of a computer enclosure with a drive bracket in accordance with another preferred embodiment of the present invention.
Figure 4:
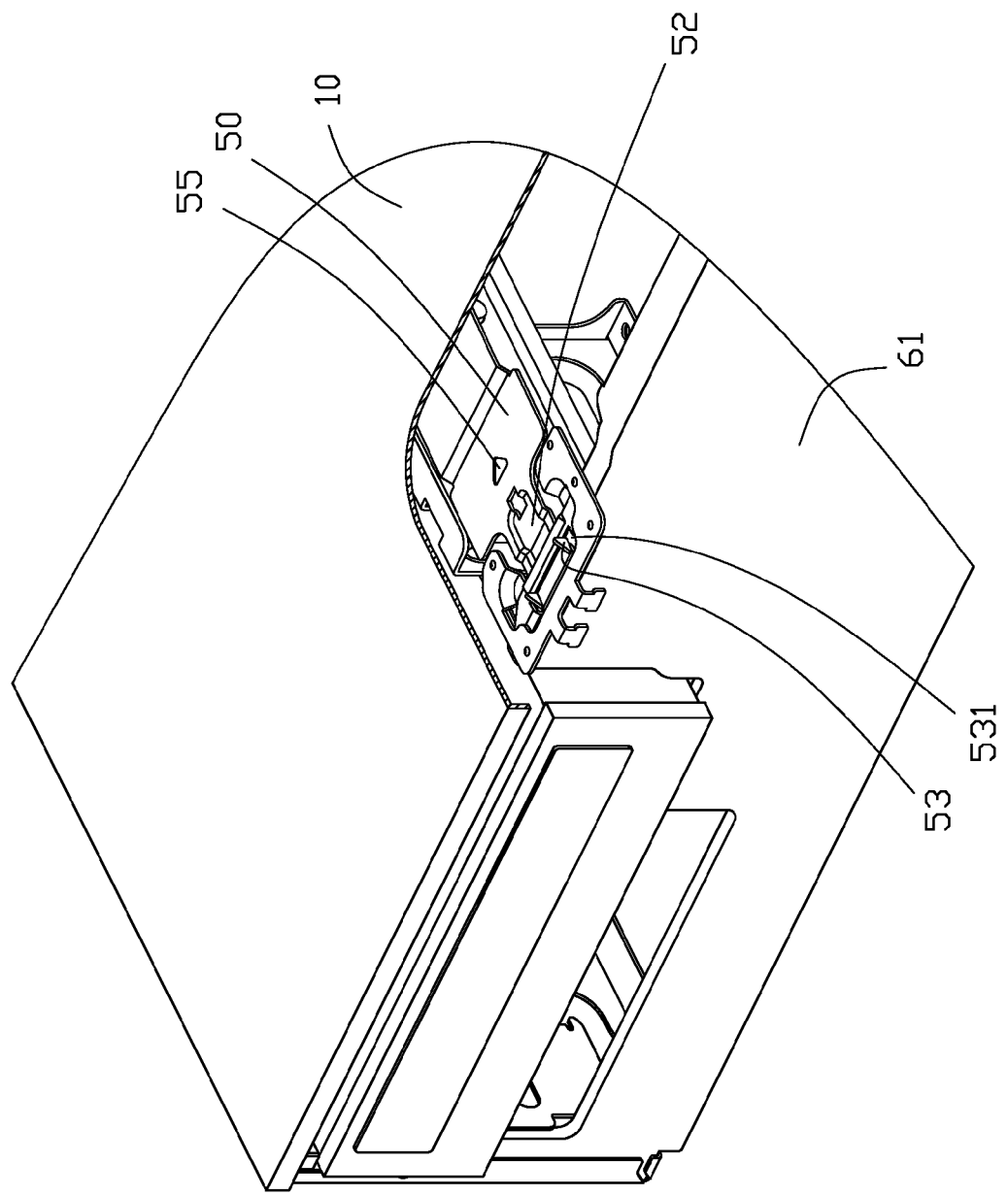
FIG. 4 is similar to FIG. 3, but viewed from another aspect.

Referring to FIGS. 3 and 4, a computer enclosure in accordance with another preferred embodiment of the present invention comprises the cover panel 10, the drive bracket 30, a rectangular blocking piece 50, and a chassis 60. The chassis 60 includes a bottom plate for mounting a motherboard thereon, and a front plate 61 perpendicularly extending from the bottom plate. The blocking piece 50 is a latch device.

The latch device 50 is secured to the cover panel 10 by riveting, and is used to detachably mount the cover panel 10 to the chassis 60. The cover panel 10 defines an opening 11 therein. A pressing portion 55 of the latch device 50 is exposed and accessible via the opening 11. An extension 52 is formed at a side of the latch device 50 extending towards the front plate 61 of the chassis 60 and forms a pair of hooks 53 extending from the distal free end thereof. When the cover panel 10 is mounted on the chassis 60, the hooks 53 are inserted into a corresponding latch slot 531 defined in the front plate 61 to secure the cover panel 10 to the chassis 60. When the cover panel 10 is disassembled from the chassis 60, the pressing portion 55 of the latch device 50 is pressed down via the opening 11, and the hooks 53 disengage from the latch slot 531.

A flange 511 extends downwardly and perpendicularly from edges of a fixing end 51 of the latch device 50, abutting against the top flange 35 of the drive bracket 30. The pressing portion 55 is disposed between the fixing end 51 and the extension 52. The flange 511 resists against the top flange 35 of the drive bracket 30 so that the side panel 34 of the drive bracket 30 cannot deform outward.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer enclosure comprising:
    a chassis;
    a cover panel attached to the chassis, the chassis and the cover panel cooperatively forming an enclosure;

a blocking piece attached on an inner surface of the cover panel; and a drive bracket secured in the enclosure, the drive bracket comprising a side panel;

wherein the blocking piece is disposed adjacent the side panel of the drive bracket, and the blocking piece is configured for resisting against an outside of the side panel for preventing the drive bracket from deforming outward.

2. The computer enclosure as described in claim 1, wherein the blocking piece resists against a top edge of the side panel of the drive bracket.

3. The computer enclosure as described in claim 2, wherein a top flange is perpendicularly bent out from the top edge of the outside of the side panel, the blocking piece resisting against the top flange.

4. The computer enclosure as described in claim 3, wherein the blocking piece includes a flange extending downwardly and perpendicularly from edges of the blocking piece, the flange of the blocking piece resisting against the top flange of the drive bracket.

5. The computer enclosure as described in claim 4, wherein a portion of the flange, at which the flange resists against the top flange, is formed in an arc shape so as to press out the top flange of the side panel.

6. The computer enclosure as described in claim 1, wherein the blocking piece is a protrusion formed on the cover panel.

7. The computer enclosure as described in claim 1, wherein the blocking piece is a latch device.

8. The computer enclosure as described in claim 7, wherein the cover panel having an opening defined therein, a pressing portion of the latch device is exposed outside through the opening.

9. The computer enclosure as described in claim 8, wherein the latch device has a fixing end secured to the cover panel; and a distal free end having a pair of hooks engaged with the chassis.

10. The computer enclosure as described in claim 9, wherein the pressing portion is disposed between the fixing end and the distal free end.

11. A computer enclosure comprising:

a chassis including a bottom plate configured for mounting a motherboard thereon and a front plate perpendicularly adjoining the bottom plate;

a cover panel attached to the chassis, the chassis and the cover panel cooperatively forming an enclosure;

a drive bracket mounted in the chassis, the drive bracket comprising a side panel;

a blocking piece attached on an inner surface of the cover panel, the blocking piece being disposed adjacent to the side panel of the drive bracket, and the blocking piece is configured for resisting against an outside of the side panel for preventing the drive bracket from deforming outward.

12. The computer enclosure as described in claim 11, wherein the front plate comprises an latch slot, and the blocking piece comprises a fixing end secured on the inner surface of the cover panel, a distal free end extending from the fixing end for lockingly engaged in the latch slot.

13. The computer enclosure as described in claim 12, wherein the cover panel has an opening defined therein, and the blocking piece comprises a pressing portion exposed through the opening of the cover panel.

* * * * *